US012662978B2

(12) United States Patent
Ivakitch

(10) Patent No.: US 12,662,978 B2
(45) Date of Patent: Jun. 23, 2026

(54) ACOUSTIC PANEL WITH DIFFERENT CELL CONFIGURATIONS

(71) Applicant: Pratt & Whitney Canada Corp., Longueuil (CA)

(72) Inventor: Richard Ivakitch, Scarborough (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/434,597

(22) Filed: Feb. 6, 2024

(65) Prior Publication Data

US 2025/0250950 A1    Aug. 7, 2025

(51) Int. Cl.
| | |
|---|---|
| *F02K 1/82* | (2006.01) |
| *B64C 1/40* | (2006.01) |
| *F02C 7/045* | (2006.01) |
| *F02C 7/24* | (2006.01) |
| *B64D 33/02* | (2006.01) |

(52) U.S. Cl.
CPC ............... *F02K 1/827* (2013.01); *B64C 1/40* (2013.01); *F02C 7/045* (2013.01); *F02C 7/24* (2013.01); *B64D 2033/0206* (2013.01); *F05D 2250/283* (2013.01); *F05D 2260/963* (2013.01); *F23R 2900/00014* (2013.01); *G10K 2210/1281* (2013.01)

(58) Field of Classification Search
CPC . F02K 1/827; F02C 7/045; F02C 7/24; B64C 1/40; B64D 2033/0206; F05D 2260/963; G10K 2210/1281; F23R 2900/00014
See application file for complete search history.

(56) References Cited

U.S. PATENT DOCUMENTS

| | | | |
|---|---|---|---|
| 3,819,007 | A | 6/1974 | Wirt |
| 3,887,031 | A | 6/1975 | Wirt |
| 4,231,447 | A | 11/1980 | Chapman |
| 4,298,090 | A | 11/1981 | Chapman |
| 4,671,841 | A | 6/1987 | Stephens |

(Continued)

FOREIGN PATENT DOCUMENTS

| | | |
|---|---|---|
| GB | 2452476 B | 1/2010 |
| WO | 2022101579 A1 | 5/2022 |

OTHER PUBLICATIONS

EP Search Report for EP Patent Application No. 25156367.2 dated Jul. 7, 2025.

*Primary Examiner* — Phutthiwat Wongwian
*Assistant Examiner* — Rene D Ford
(74) *Attorney, Agent, or Firm* — Getz Balich LLC

(57) ABSTRACT

An acoustic panel for an aircraft includes a skin, a plurality of first cells and a plurality of second cells interspersed with the first cells. Each first cell includes a first tube, a first endwall and a first cavity. The first tube projects vertically out from the skin to a distal end of the first tube. The first endwall closes off the first cavity at its distal end. The first cavity extends vertically through the first tube from the skin to the first endwall. Each second cell includes a second tube, a second endwall and a second cavity. The second tube projects vertically out from the skin to a distal end of the second tube. The second endwall closes off the second cavity at its distal end and is offset from the first endwall. The second cavity extends vertically through the second tube from the skin to the second endwall.

16 Claims, 10 Drawing Sheets

(56) References Cited

U.S. PATENT DOCUMENTS

| | | | |
|---|---|---|---|
| 4,944,362 | A | 7/1990 | Motsinger |
| 5,807,628 | A | 9/1998 | Mnich |
| 6,461,003 | B1 | 10/2002 | Neudeck |
| 6,758,388 | B1 | 7/2004 | Leholm |
| 7,337,875 | B2 | 3/2008 | Proscia |
| 7,588,212 | B2 | 9/2009 | Moe |
| 8,235,171 | B2 | 8/2012 | Douglas |
| 8,955,643 | B2 | 2/2015 | Liu |
| 9,909,471 | B2 | 3/2018 | Mattia |
| 10,107,139 | B1 | 10/2018 | Jones |
| 10,851,713 | B2 | 12/2020 | Roach |
| 11,415,055 | B2 | 8/2022 | Alstad |
| 11,434,819 | B2 | 9/2022 | Murugappan |
| 11,846,235 | B2 | 12/2023 | Alstad |
| 2002/0070077 | A1 | 6/2002 | Porte |
| 2007/0272483 | A1* | 11/2007 | Morin .................... F02K 1/827 181/292 |
| 2012/0090693 | A1 | 4/2012 | Chelin |
| 2013/0063661 | A1 | 3/2013 | Toita |
| 2015/0041248 | A1 | 2/2015 | Ichihashi |
| 2015/0086335 | A1* | 3/2015 | Merlo .................... F02C 7/045 181/292 |
| 2016/0017775 | A1* | 1/2016 | Mattia .................... F02K 1/827 181/292 |
| 2018/0245516 | A1* | 8/2018 | Howarth ................ B32B 27/06 |
| 2020/0103139 | A1* | 4/2020 | Schiller ................ G10K 11/162 |
| 2023/0088770 | A1* | 3/2023 | Mercat .................... B64C 1/40 181/141 |
| 2023/0286639 | A1 | 9/2023 | Mendoza |

* cited by examiner

ACOUSTIC PANEL WITH DIFFERENT CELL CONFIGURATIONS

TECHNICAL FIELD

This disclosure relates generally to an acoustic panel for, for example, an aircraft propulsion system.

BACKGROUND INFORMATION

An aircraft propulsion system may include one or more acoustic panels for attenuating sound generated by its gas turbine engine. Various types and configurations of acoustic panels are known in the art. While these known acoustic panels have various benefits, there is still room in the art for improvement.

SUMMARY

According to an aspect of the present disclosure, an acoustic panel is provided for an aircraft. This acoustic panel includes a skin, a plurality of first cells and a plurality of second cells. The skin includes a plurality of perforations. Each of the first cells includes a first tube, a first endwall and a first cavity. The first tube projects vertically out from the skin to a distal end of the first tube. The first endwall closes off the first cavity at the distal end of the first tube. The first cavity extends vertically through the first tube from the skin to the first endwall. The first cavity is fluidly coupled with a first set of one or more of the perforations. The second cells are interspersed with the first cells. Each of the second cells includes a second tube, a second endwall and a second cavity. The second tube projects vertically out from the skin to a distal end of the second tube. The second endwall closes off the second cavity at the distal end of the second tube and is vertically offset from the first endwall of each of the first cells. The second cavity extends vertically through the second tube from the skin to the second endwall. The second cavity is fluidly coupled with a second set of one or more of the perforations.

According to another aspect of the present disclosure, another acoustic panel is provided for an aircraft. This acoustic panel includes a perforated skin, a non-perforated skin and a cellular core. The cellular core is arranged vertically between and is connected to the perforated skin and the non-perforated skin. The cellular core includes a plurality of first cells and a plurality of second cells. The first cells are arranged in an array. Each of the first cells extends radially between the perforated skin and the non-perforated skin. Each of the first cells includes an internal first cavity extending radially through the cellular core from the perforated skin to the non-perforated skin. The second cells are dispersed within the array of the first cells. Each of the second cells projects radially out from the perforated skin to a distal second cell end that is spaced radially from the non-perforated skin by an open volume. Each of the second cells includes an internal second cavity extending radially within the cellular core to the perforated skin.

According to still another aspect of the present disclosure, another acoustic panel is provided for an aircraft. This acoustic panel includes an aircraft propulsion system which includes an acoustic panel and a flowpath. The acoustic panel includes a perforated skin and a plurality of cells connected to an interior side of the perforated skin. An exterior side of the perforated skin forms a peripheral boundary of the flowpath. Each of the cells includes an internal cavity extending longitudinally along a centerline between a first cavity end and a second cavity end. The first cavity end and the second cavity end are each formed by the perforated skin. At least an intermediate portion of the centerline is curved.

The internal first cavity may have a lateral first width. The internal second cavity may have a lateral second width that is less than the lateral first width.

The internal first cavity may have a lateral first width. The internal second cavity may have a lateral second width that is greater than the lateral first width.

The acoustic panel may also include a plurality of third cells interspersed with the first cells and the second cells. Each of the third cells may include a third tube, a third endwall and a third cavity. The third tube may project vertically out from the skin to a distal end of the third tube. The third endwall may close off the third cavity at the distal end of the third tube. The third endwall may be vertically offset from the first endwall of each of the first cells and the second endwall of each of the second cells. The third cavity may extend vertically through the third tube from the skin to the third endwall. The third cavity may be fluidly coupled with a third set of one or more of the perforations.

A first of the first cells may be disposed laterally between and adjacent a first of the second cells and a second of the second cells.

A first of the first cells may be adjacent a first of the second cells and a second of the second cells. The first of the second cells may be adjacent the second of the second cells.

A second of the first cells may be adjacent the first of the second cells and the second of the second cells.

The acoustic panel may also include a monolithic body including the first cells and the second cells.

The monolithic body may also include the skin.

Each of the first cells may have a first vertical height. Each of the second cells may have a second vertical height that is different than the first vertical height.

The first cavity may have a first cross-sectional geometry. The second cavity may have a second cross-sectional geometry. The first cross-sectional geometry and the second cross-sectional geometry may have a common shape.

The first cavity may have a first cross-sectional geometry. The second cavity may have a second cross-sectional geometry. The first cross-sectional geometry and the second cross-sectional geometry may have a common dimension.

The first cavity may have a first cross-sectional geometry. The second cavity may have a second cross-sectional geometry. A dimension of the first cross-sectional geometry may be different than a corresponding dimension of the second cross-sectional geometry.

At least one of the first tube or the second tube may have a straight centerline.

At least one of the first tube or the second tube may have a non-straight centerline.

The acoustic panel may also include a second skin forming the first endwall of each of the first cells. The second skin may laterally overlap and may be vertically spaced form each of the second cells.

The first set of the one or more of the perforations may (e.g., only) include a quantity X of the perforations. The second set of the one or more of the perforations may (e.g., only) include a quantity Y of the perforations that may (or may not) be different than the quantity X.

A third set of one or more of the perforations may be fluidly coupled with an interstitial space formed by and outside of one or more of the first cells and one or more of the second cells.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
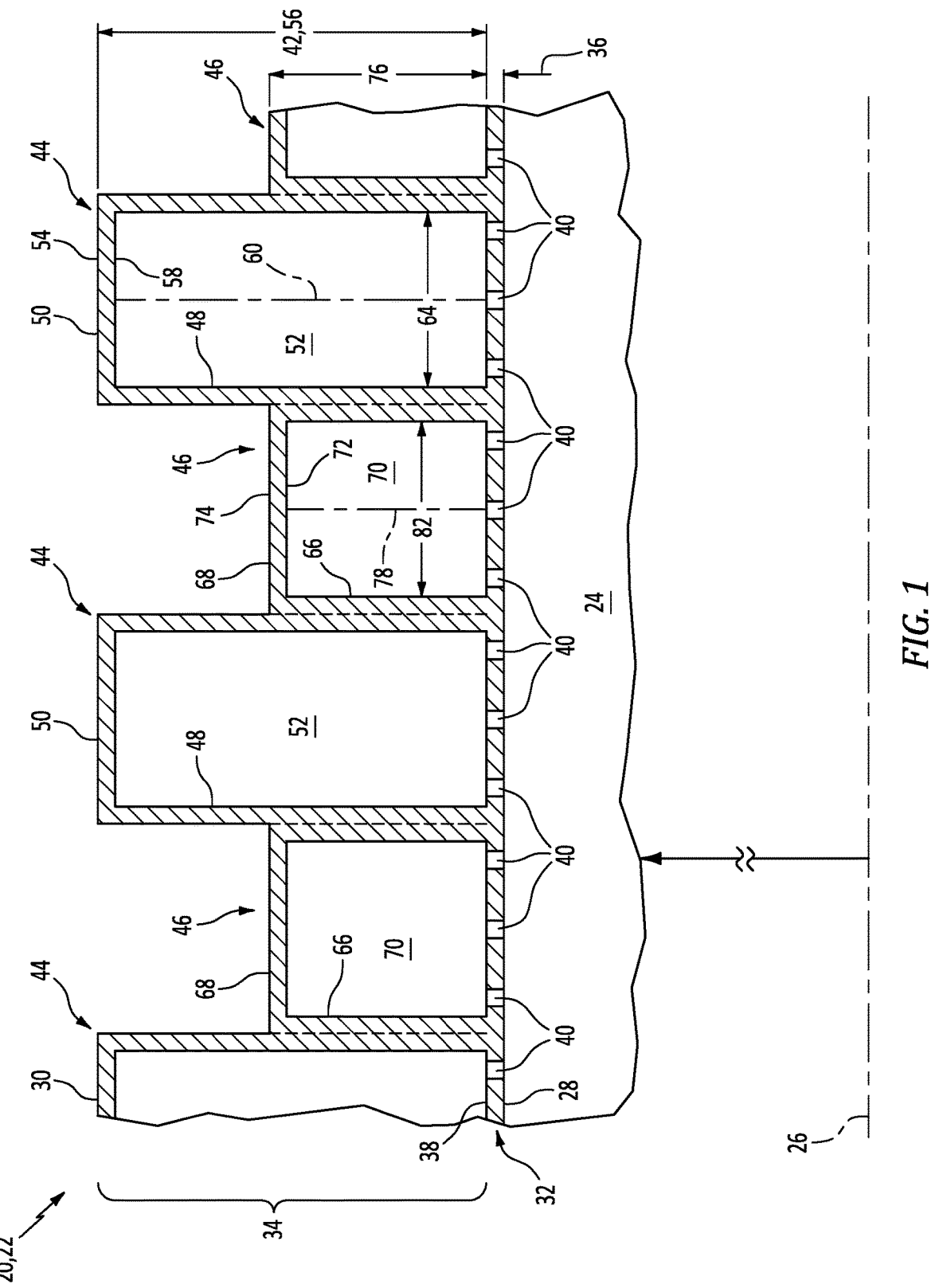
FIG. 1 is a partial side sectional illustration of an acoustic panel.
Figure 2:
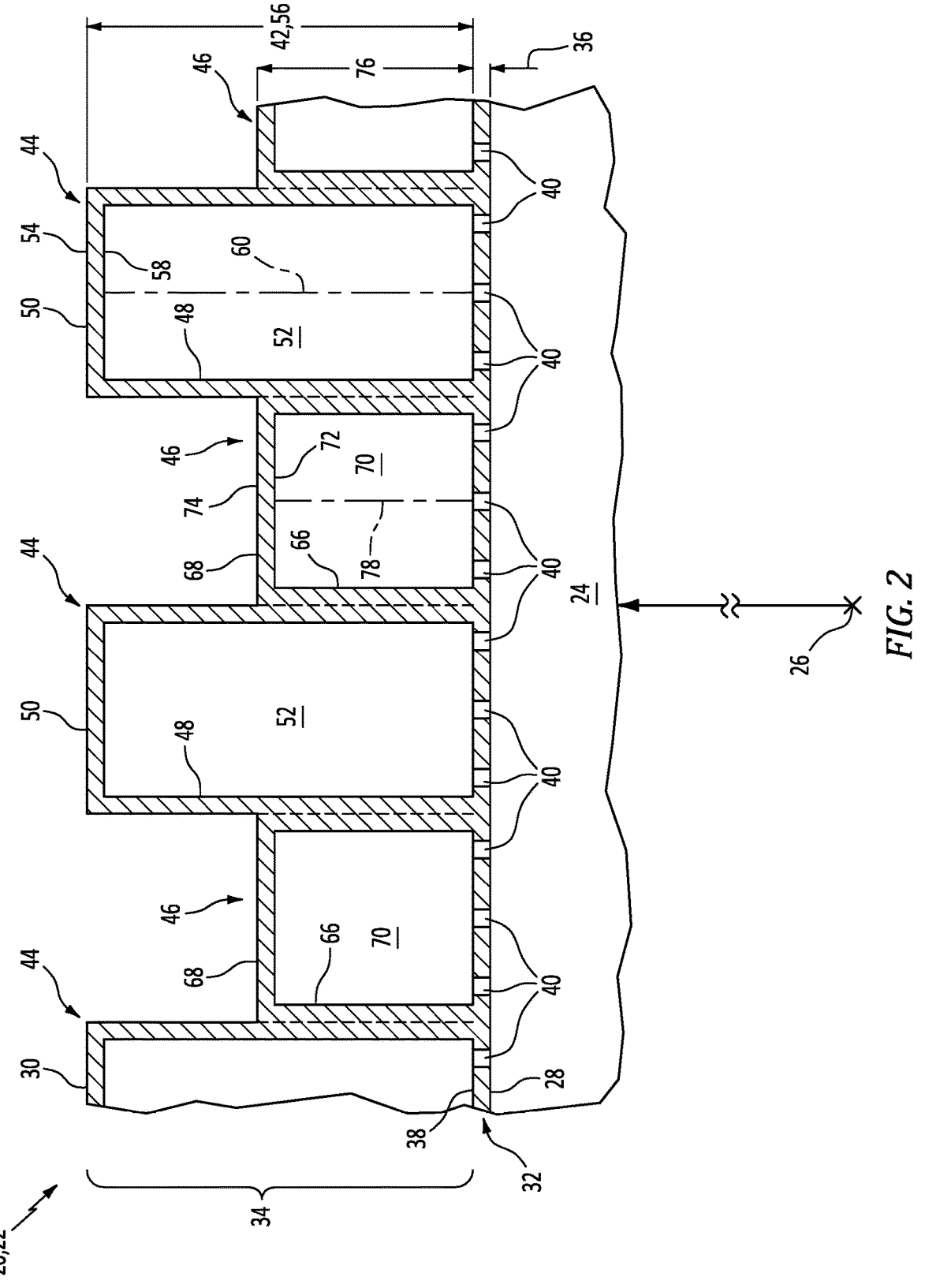
FIG. 2 is a partial cross-sectional illustration of the acoustic panel.

FIGS. 1 and 2 illustrate an acoustic panel 20 for an aircraft. The aircraft may be an airplane, a helicopter, a drone (e.g., an unmanned aerial vehicle (UAV)) or any other manned or unmanned aerial vehicle or system. The acoustic panel 20 may be configured to attenuate sound (e.g., noise) generated by a propulsion system of the aircraft. The aircraft propulsion system may be a turbofan propulsion system, a turbojet propulsion system, a turboprop propulsion system or any other ducted-rotor or open-rotor aircraft propulsion system. The acoustic panel 20 may be part of a housing (e.g., a nacelle) for an engine (e.g., a gas turbine engine) of the aircraft propulsion system. The acoustic panel 20, for example, may be configured as or otherwise included as part of an inner barrel, an outer barrel, a translating sleeve, a blocker door, a bifurcation, etc. Alternatively, the acoustic panel 20 may be part of another component of the aircraft such as, but not limited to, an engine pylon, an aircraft wing or an aircraft fuselage. Furthermore, the acoustic panel 20 may also or alternatively be configured to attenuate aircraft related sound other than the sound generated by the aircraft propulsion system. However, for ease of description, the acoustic panel 20 may be described below as attenuating propulsion system sound and with respect to a component 22 (e.g., barrel) of the engine housing along a flowpath 24 (e.g., a bypass flowpath) within the aircraft propulsion system.

Referring to FIG. 1, the acoustic panel 20 extends axially along an axis 26. Briefly, this axis 26 may be a centerline axis of the aircraft propulsion system, a centerline axis of the engine housing and/or a centerline axis of the component 22 (e.g., the barrel) which is formed by or otherwise includes the acoustic panel 20. The acoustic panel 20 extends radially between and to a radial inner side 28 of the acoustic panel 20 and a radial outer side 30 of the acoustic panel 20. Referring to FIG. 2, the acoustic panel 20 extends circumferentially about (e.g., partially or completely around) the axis 26. The component 22 and/or its acoustic panel 20 may thereby have a curved (e.g., arcuate, cylindrical, conical, frustoconical) geometry. The present disclosure, however, is not limited to such an exemplary curved geometry.

The acoustic panel 20 of FIGS. 1 and 2 includes a perforated face skin 32 and a cellular core 34. For ease of description, the face skin 32 is described below as an inner skin of the acoustic panel 20 where the cellular core 34 is radially outboard of the face skin 32. With such an arrangement, the acoustic panel 20 and its face skin 32 may form an outer peripheral boundary of at least a portion of the flowpath 24 within the aircraft propulsion system. It is contemplated, however, the face skin 32 may alternatively be an outer skin of the acoustic panel 20 where the cellular core 34 is radially inboard of the face skin 32. With such an arrangement, the acoustic panel 20 and its face skin 32 may form an inner peripheral boundary of at least a portion of the flowpath 24 within the aircraft propulsion system. The present disclosure, however, is not limited to the foregoing exemplary arrangements. The acoustic panel 20, for example, may form a circumferential side boundary of the flowpath 24 and/or may otherwise be located with the aircraft propulsion system and/or the aircraft.

The face skin 32 of FIGS. 1 and 2 is a relatively thin sheet or layer of material that extends axially along and circumferentially about the axis 26. This face skin material may be or otherwise include a metal, a polymer (e.g., a thermoplastic or thermoset material) or a fiber reinforced composite (e.g., fiber reinforcement such as fiberglass, carbon fiber and/or aramid fibers within a polymer matrix). The face skin 32 has a radial thickness 36. This face skin thickness 36 extends radially between opposing sides 28 and 38 of the face skin 32, where the exterior side of the face skin 32 is also the inner side 28 of the acoustic panel 20 of FIGS. 1 and 2. The face skin thickness 36 may remain uniform (e.g., constant) as the face skin 32 extends axially along and/or circumferentially about the axis 26. The face skin 32 includes a plurality of perforations 40; e.g., apertures such as through-holes. Each of these face skin perforations 40 extends radially through the face skin 32 along a centerline of the respective face skin perforation 40 between the face skin sides 28 and 38. This perforation centerline may be perpendicular to the face skin side 28, 38.

The cellular core 34 is connected to the face skin 32 at its interior side 38. The cellular core 34, for example, may be formed integral with the face skin 32 such that the acoustic panel 20 is formed as a monolithic body. The acoustic panel 20, for example, may be additively manufactured, machined, cast and/or otherwise formed as a single, unitary body. Alternatively, the cellular core 34 may be welded, brazed, fused, adhered and/or otherwise bonded to the face skin 32.

The cellular core 34 of FIGS. 1 and 2 extends axially along and circumferentially about the axis 26. The cellular core 34 projects radially out from the face skin 32 at its interior side 38 to the panel outer side 30; e.g., a back side of the cellular core 34. Here, the panel outer side 30 is also a back side of the acoustic panel 20. The cellular core 34 has a radial depth 42. This core depth 42 extends radially between the face skin interior side 38 and the panel outer side 30. The core depth 42 may remain uniform (e.g., constant) as the cellular core 34 extends axially along and/or circumferentially about the axis 26. The core depth 42 may be substantially larger than the face skin thickness 36. The core depth 42, for example, may be at least ten to forty times (10-40×), or more, larger than the face skin thickness 36. The cellular core 34 of the present disclosure, however, is not limited to such an exemplary dimensional relationship and may vary based on sound attenuation requirements, spatial requirements, etc.

Figure 3:
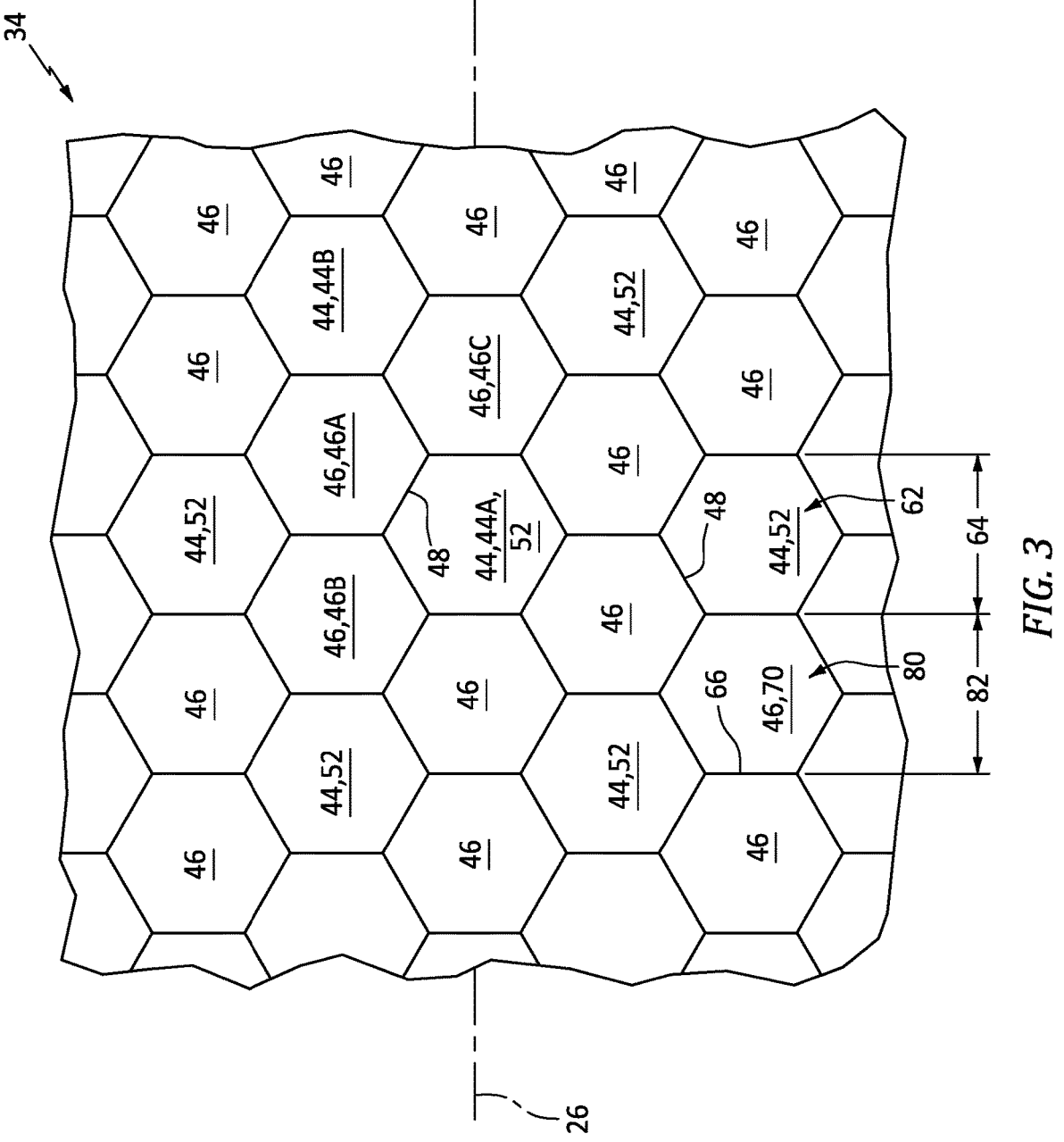
FIG. 3 is a partial plan view illustration of a cellular core.

Referring to FIG. 3, the cellular core 34 includes one or more first cells 44 and one or more second cells 46. The first cells 44 are arranged axially along and circumferentially about the axis 26 in a first cell array. The second cells 46 are arranged axially along and circumferentially about the axis 26 in a second cell array. The second cells 46 may be interspersed with the first cells 44, and the first cells 44 may be interspersed with the second cells 46. The second cells 46 of FIG. 3, for example, are dispersed within (e.g., axially and/or circumferentially throughout) the first cell array. The first cells 44 are dispersed within (e.g., axially and/or circumferentially throughout) the second cell array.

Each first cell 44 may be surrounded by a cluster of the second cells 46. Each first cell 44 of FIG. 3 is thereby disposed laterally (e.g., axially and/or circumferentially) between and adjacent one or more laterally neighboring pairs of the second cells 46. Each first cell 44 may also be connected to (e.g., formed integral with or otherwise attached to) its laterally adjacent second cells 46. One or more of the second cells 46 (e.g., 46A) may each be disposed laterally between and adjacent a laterally neighboring pair of the first cells 44 (e.g., 44A and 44B). Each of these second cells 46 (e.g., 46A) may also be connected to its laterally neighboring first cells 44 (e.g., 44A and 44B). One or more of the second cells 46 (e.g., 46A) may each be disposed laterally between and adjacent a laterally neighboring pair of first and second cells 44 and 46 (e.g., 44A and 46B). Each of these second cells 46 (e.g., 46A) may also be connected to its laterally neighboring first and second cells 44 and 46 (e.g., 44A and 46B). One or more of the second cells 46 (e.g., 46A) may each be disposed laterally between and adjacent a laterally neighboring pair of the second cells 46 (e.g., 46B and 46C). Each of these second cells 46 (e.g., 46A) may also be connected to its laterally neighboring second cells 46 (e.g., 46B and 46C). The present disclosure, however, is not limited to the foregoing exemplary pattern of the first cells 44 and the second cells 46 in FIG. 3. For example, the arrangement of the first cells 44 and the second cells 46 in FIG. 3 may be reversed or otherwise arranged.

Referring to FIGS. 1 and 2, each first cell 44 may be configured as a resonator; e.g., a Helmholtz resonator, a muffler, etc. Each first cell 44 of FIGS. 1 and 2, for example, includes a first tube 48, a first endwall 50 and an internal first cavity 52. The first tube 48 projects radially out from the face skin 32 at its interior side 38 to the first endwall 50. The first tube 48 is connected to the face skin 32 and the first endwall 50. The first tube 48 may be configured as a tubular sidewall. The first tube 48 of FIG. 3, for example, extends circumferentially about (e.g., completely around) the first cavity 52. Referring to FIGS. 1 and 2, the first endwall 50 is disposed at the panel outer side 30. The first endwall 50 of FIGS. 1 and 2, for example, closes off the first cavity 52 at a distal end 54 of the first tube 48. Each first cell 44 may thereby have a radial height 56 that is equal to the core height 42. The first cavity 52 extends radially within the respective first cell 44 and, more generally, the cellular core 34 from the face skin interior side 38 to an interior side 58 of the first endwall 50. The first cavity 52 extends laterally within the respective first cell 44 between laterally opposing sides of a sidewall of the first tube 48; e.g., see FIGS. 1-3.

This first cavity 52 is fluidly coupled with the flowpath 24 through one or more of the face skin perforations 40.

Figure 4:
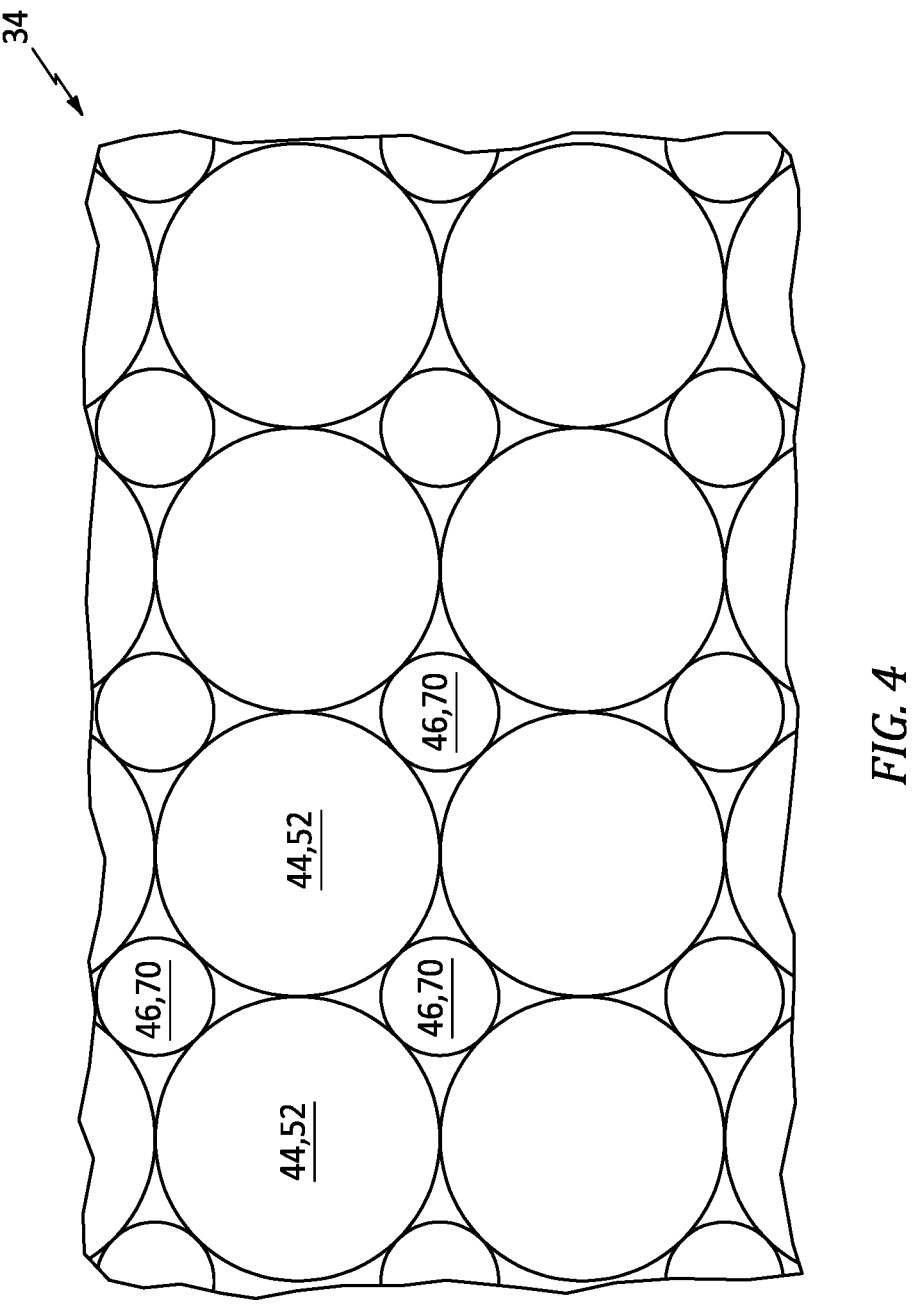
FIG. 4 is a partial plan view illustration of another cellular core.

Referring to FIG. 3, the first cavity 52 has a cross-sectional geometry when viewed, for example, in a reference plane perpendicular to a centerline 60 (see FIGS. 1 and 2) of the respective first cell 44. The first cavity geometry of FIG. 3 has a polygonal shape. Examples of the polygonal shape include, but are not limited to, a hexagon, a rectangle, a triangle, an octagon and a rhombus. This polygonal shape may be a regular shape or an irregular shape. The polygonal shape may be a symmetrical shape or an asymmetrical shape. The present disclosure, however, is not limited to such an exemplary geometric shape. For example, referring to FIG. 4, the first cavity geometry may alternatively have a curved shape such as a circular shape, an oval shape, etc. Referring again to FIG. 3, the first cavity geometry has a cross-sectional area 62 and a lateral width 64. These first cavity dimensions 62 and 64 may remain approximately or completely uniform (e.g., constant) as the first cavity 52 of FIGS. 1 and 2 extends longitudinally along the first cell centerline 60 between the face skin 32 and the first endwall 50. The present disclosure, however, is not limited to such an exemplary uniform geometry. For example, in some embodiments, the shape of the first cavity geometry may change as the respective first cell 44 extends longitudinally along its first cell centerline 60 between the face skin 32 and the first endwall 50. For example, the shape of the first cavity geometry may be polygonal (e.g., rectangular) at one end (e.g., adjacent 32 or 50) and the shape may be curved (e.g., circular or oval) at the other end (e.g., adjacent 50 or 32). In another example, the shape of the first cavity geometry may be the same at each end (e.g., 32 and 50) and different at a longitudinally intermediate location along its first cell centerline 60.

Each second cell 46 may be configured as a resonator; e.g., a Helmholtz resonator, a muffler, etc. Each second cell 46 of FIGS. 1 and 2, for example, includes a second tube 66, a second endwall 68 and an internal second cavity 70. The second tube 66 projects radially out from the face skin 32 at its interior side 38 to the second endwall 68. The second tube 66 is connected to the face skin 32 and the second endwall 68. The second tube 66 may be configured as a tubular sidewall. The second tube 66 of FIG. 3, for example, extends circumferentially about (e.g., completely around) the second cavity 70. Referring to FIGS. 1 and 2, the second endwall 68 is radially recessed (e.g., spaced) inward from the panel outer side 30. The second endwall 68 of FIGS. 1 and 2, for example, closes off the second cavity 70 at a distal end 74 of the second tube 66. Each second cell 46 thereby has a radial height 76 that is less than the first cell height 56 and the core height 42. The second cavity 70 extends radially within the respective second cell 46 and, more generally, the cellular core 34 from the face skin interior side 38 and an interior side 72 of the second endwall 68. The second cavity 70 extends laterally within the respective second cell 46 between laterally opposing sides of a sidewall of the second tube 66; e.g., see FIGS. 1-3. This second cavity 70 is fluidly coupled with the flowpath 24 through one or more of the face skin perforations 40.

Referring to FIG. 3, the second cavity 70 has a cross-sectional geometry when viewed, for example, in a reference plane perpendicular to a centerline 78 (see FIGS. 1 and 2) of the respective second cell 46. The second cavity geometry of FIG. 3 has a polygonal shape. Examples of the polygonal shape include, but are not limited to, a hexagon, a rectangle, a triangle, an octagon and a rhombus. This polygonal shape may be a regular shape or an irregular shape. The polygonal shape may be a symmetrical shape or an asymmetrical shape. The present disclosure, however, is not limited to such an exemplary geometric shape. For example, referring to FIG. 4, the second cavity geometry may alternatively have a curved shape such as a circular shape, an oval shape, etc. Referring again to FIG. 3, the second cavity geometry has a cross-sectional area 80 and a lateral width 82. These second cavity dimensions 80 and 82 may remain approximately or completely uniform (e.g., constant) as the second cavity 70 of FIGS. 1 and 2 extends longitudinally along the second cell centerline 78 between the face skin 32 and the second endwall 68. The present disclosure, however, is not limited to such an exemplary uniform geometry. For example, in some embodiments, the shape of the second cavity geometry may change as the respective second cell 46 extends longitudinally along its second cell centerline 78 between the face skin 32 and the second endwall 68. For example, the shape of the second cavity geometry may be polygonal (e.g., rectangular) at one end (e.g., adjacent 32 or 68) and the shape may be curved (e.g., circular or oval) at the other end (e.g., adjacent 68 or 32). In another example, the shape of the second cavity geometry may be the same at each end (e.g., 32 and 68) and different at a longitudinally intermediate location along its second cell centerline 78.

Figures 5, 6:
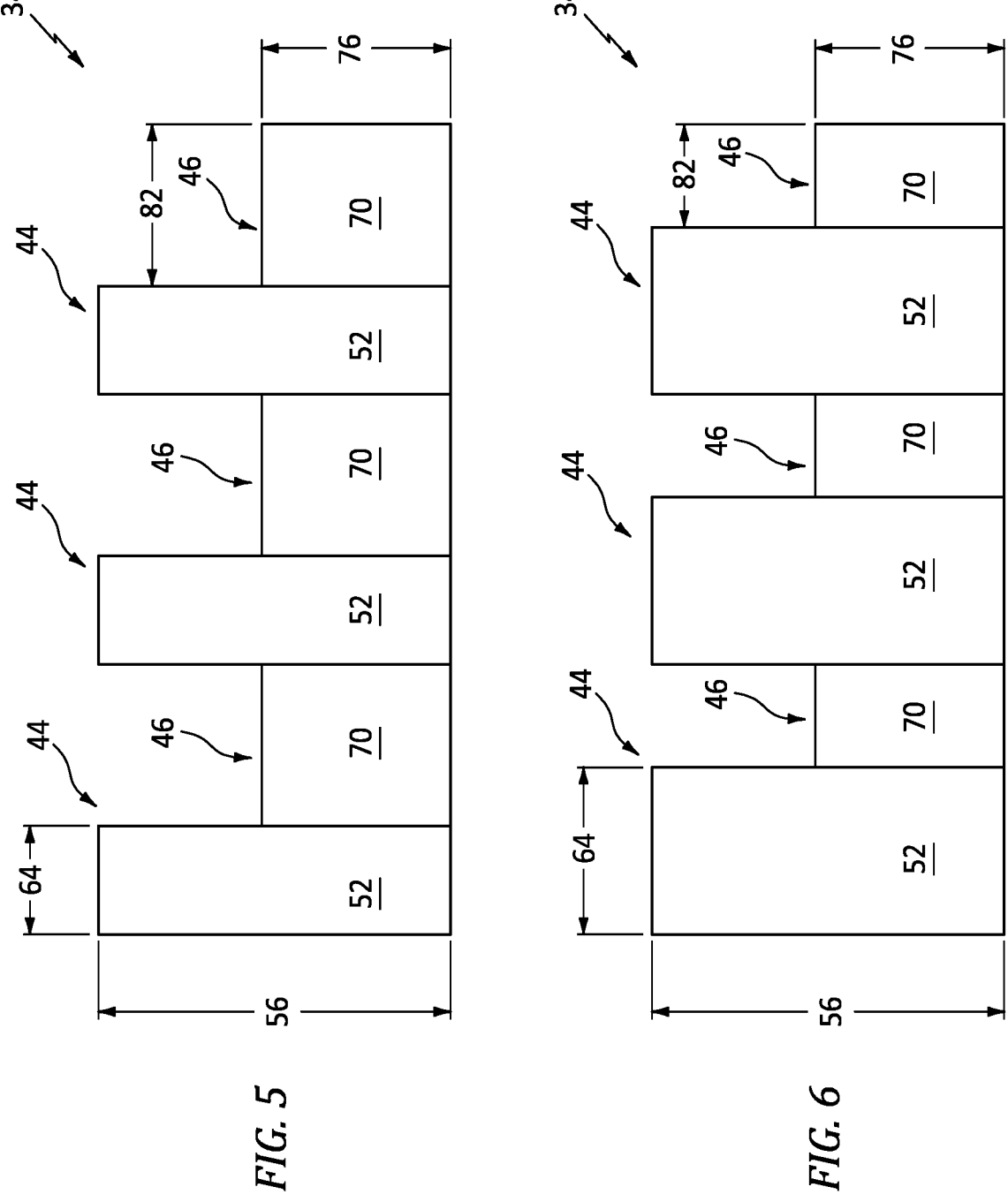
FIGS. 5 and 6 are partial schematic illustrations of the cellular core with various different dimensional relationships.

The first cavity geometry and the second cavity geometry of FIG. 3 share a common shape. The first cavity geometry and the second cavity geometry of FIG. 3 also share common dimensional values; e.g., the cross-sectional area 62, 80, the lateral width 64, 82, etc. The cellular core 34 of the present disclosure, however, is not limited to such an exemplary arrangement. The shape of the first cavity geometry, for example, may be different than the shape of the second cavity geometry. Referring to FIGS. 5 and 6, one or more or all of the dimensional values (e.g., 64) of the first cavity geometry may also or alternatively be different than one or more corresponding dimensional values (e.g., 82) of the second cavity geometry. For example, a lateral size (e.g., cross-sectional area, lateral width) of each first cell 44 of FIG. 5 is less than a lateral size (e.g., cross-sectional area, lateral width) of each second cell 46, whereas the cell height 56 of each first cell 44 of FIG. 5 is greater than the cell height 76 of each second cell 46. In another example, the lateral size (e.g., cross-sectional area, lateral width) of each first cell 44 of FIG. 6 is greater than the lateral size (e.g., cross-sectional area, lateral width) of each second cell 46, whereas the cell height 56 of each first cell 44 of FIG. 5 is less than the cell height 76 of each second cell 46. Of course, it is also contemplated, different first cells 44 may have a common lateral size and varying cell heights and/or different second cells 46 may have a common lateral size and varying cell heights.

During operation of the acoustic panel 20 of FIGS. 1 and 2, sound waves (e.g., noise pressure waves) may enter each cell cavity 52, 70 through the respective face skin perforation(s) 40. These sound waves may travel through the respective cell cavity 52, 70 and reflect against the respective cell endwall 50, 68. The reflected sound waves may travel back through respective cell cavity 52, 70 and exit the acoustic panel 20 through the respective face skin perforation(s) 40, where those reflected sound waves may be out of phase from and destructively interfere with incoming soundwaves. Of course, the sound waves may also or alternatively reflect against one or more other elements of the acoustic panel 20 which may further influence sound attenuation. Frequencies of the sound waves attenuated by the acoustic panel 20 may relate to the cell heights 56, 76. Thus, by providing the first cells 44 and the second cells 46 with different cell heights 56 and 76, the acoustic panel 20 may attenuate multiple sound wave frequencies. Moreover, by providing the first cells 44 and the second cells 46 with different cell heights 56 and 76 rather than disposing a baffle in a subset of uniform height cavities, an overall mass of the acoustic panel 20 may be reduced.

Figures 7, 8:
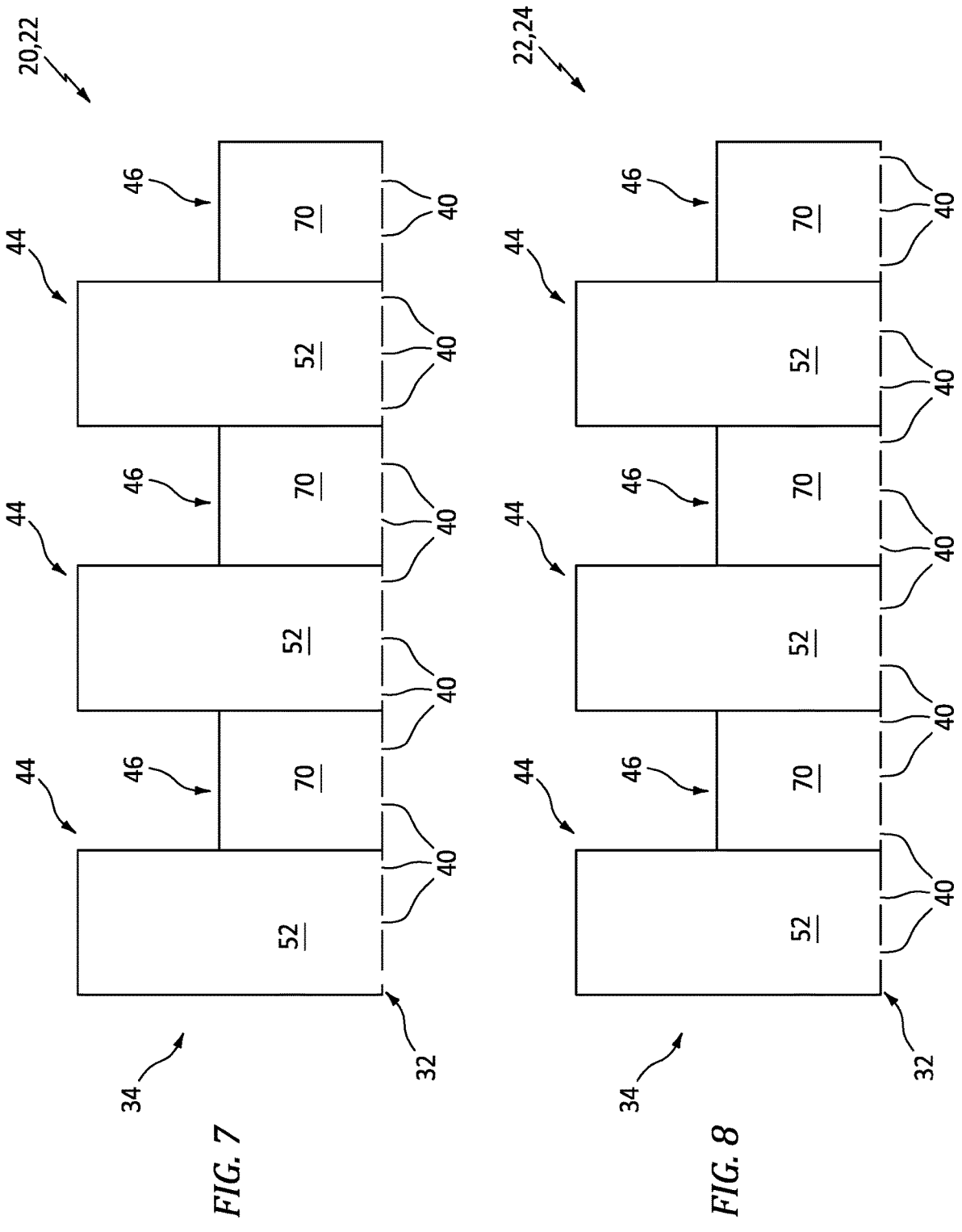
FIGS. 7 and 8 are partial schematic illustrations of the acoustic panel with various different perforation arrangements.

Each first cavity 52 is fluidly coupled to a quantity X of the face skin perforations 40. Each second cavity 70 is fluidly coupled to a quantity Y of the face skin perforations 40. In some embodiments, the quantity Y may be equal to the quantity X. In other embodiments, referring to FIGS. 7 and 8, the quantity Y may be different (e.g., greater or less) than the quantity X.

Figure 9:
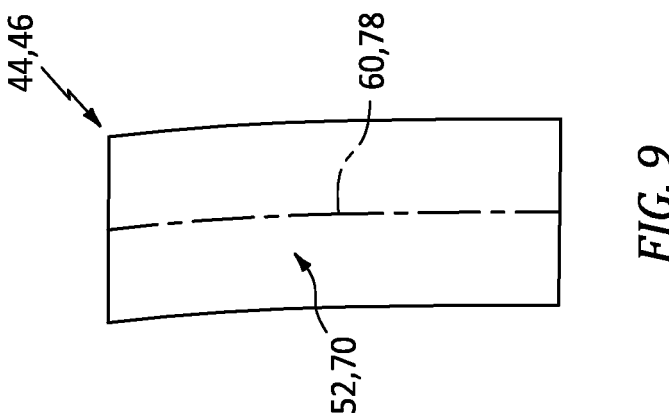
FIG. 9 is a schematic illustration of an acoustic panel cell with a curved centerline.

Referring to FIGS. 1 and 2, the first cell centerline 60 and the second cell centerline 78 may each be straight. The first cell centerline 60 and the second cell centerline 78 of FIGS. 1 and 2 are perpendicular to the face skin side 28, 38. However, it is contemplated the first cell centerline 60 and/or the second cell centerline 78 may alternatively be acutely angled relative to the face skin side 28, 38. Referring to FIG. 9, it is also contemplated the first cell centerline 60 and/or the second cell centerline 78 may be partially (or completely) non-straight; e.g., curved, arcuate, splined, etc.

Figure 10:
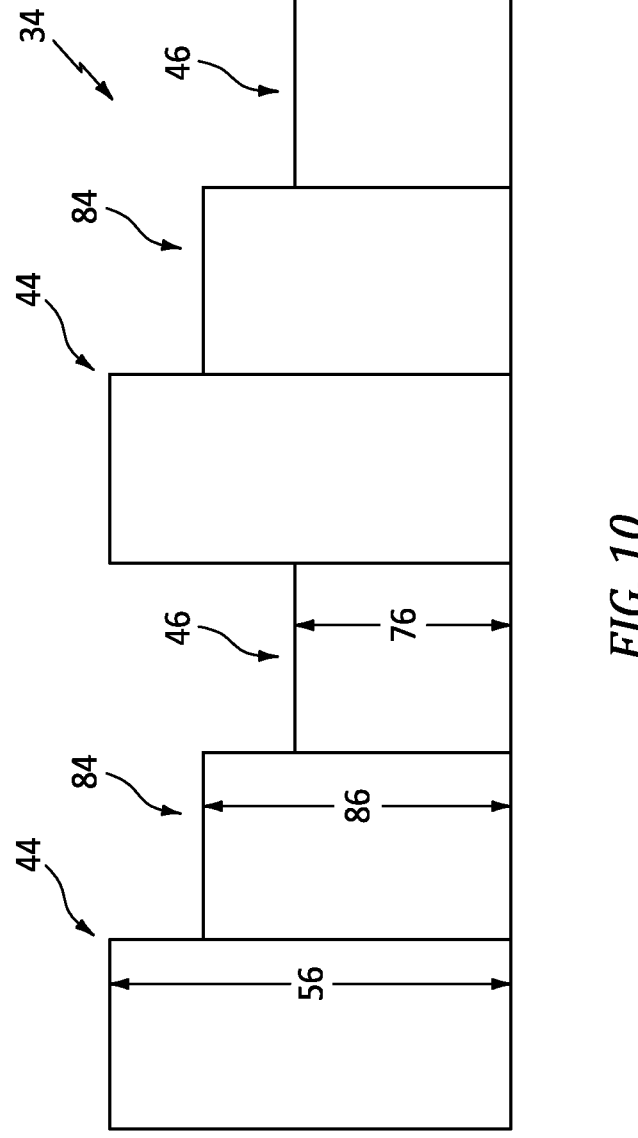
FIG. 10 is a partial schematic illustration of the acoustic panel with another arrangement of acoustic panel cells.

The acoustic panel 20 is generally described above as including two sets of cells—the first cells 44 and the second cells 46 of FIGS. 1-3. The present disclosure, however, is not limited to such an exemplary two-cell arrangement. For example, referring to FIG. 10, the acoustic panel 20 may also include one or more third cells 84 interspersed with the first cells 44 and/or the second cells 46. These third cells 84 may be generally configured similar to the first cells 44 and the second cells 46 described above. However, a radial height 86 of the third cell of FIG. 10 is different than the first cell height 56 and the second cell height 76. The third cell height 86 of FIG. 10, for example, is less than the first cell height 56 and greater than the second cell height 76. Of course, the acoustic panel 20 may also include one or more additional sets of cells with still other radial heights. It is also contemplated the radial heights of the cells within a given set may alternatively have various different values. Moreover, one or more sets of the cells included in the acoustic panel 20 may include a common cross-sectional geometry or different cross-sectional geometries.

Referring to FIGS. 1 and 2, the cells 44, 46 (and cells 84 of FIG. 10) are generally described above as projecting radially away from the face skin 32 to their respective distal ends 54, 74 spaced from the face skin 32. The present disclosure, however, is not limited to such an exemplary arrangement. For example, referring to FIG. 11, the acoustic panel 20 may also or alternatively include one or more curved cells; e.g., arcuate cells, U-shaped cells, etc. Each cell cavity 52, 70 of FIG. 11, for example, extends longitudinally along its cell centerline 60, 78 between longitudinally opposing ends 88 and 90 of the respective cell cavity 52, 70. Each of these cavity ends 88, 90 may be formed by the face skin 32 and its interior side 38. A first end portion 92 of the cell centerline 60, 78 at the first cavity end 88 and a second end portion 94 of the cell centerline 60, 78 at the second cavity end 90 may each be straight. An intermediate portion 96 of the cell centerline 60, 78 between the first end portion 92 and the second end portion 94 is curved. However, in other embodiments, the entire cell centerline 60, 78 may be curved.

Figure 11:
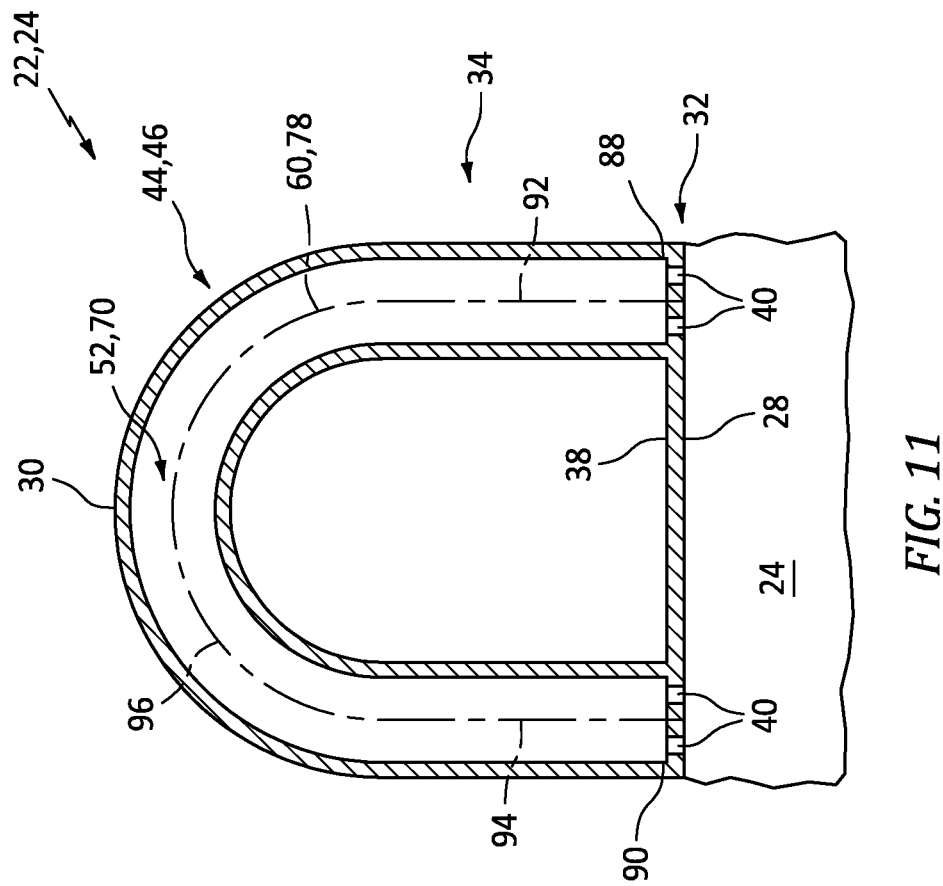
FIG. 11 is a partial sectional illustration of the acoustic panel with a curved acoustic panel cell.

In some embodiments, the shape of the cavity geometry of FIG. 11 may remain uniform as the cell 44, 46 extends longitudinally along its cell centerline 60, 78 between the ends 88 and 90. In other embodiments, the shape of the cavity geometry of FIG. 11 may change as the cell 44, 46 extends longitudinally along its cell centerline 60, 78 between the ends 88 and 90. For example, the shape of the cavity geometry may be polygonal (e.g., rectangular) at one end (e.g., adjacent 88 or 90) and the shape may be curved (e.g., circular or oval) at the other end (e.g., adjacent 90 or 88). In another example, the shape of the cavity geometry may be the same at each end (e.g., 88 and 90) and different at a longitudinally intermediate location along its cell centerline 60, 78.

In some embodiments, referring to FIG. 11, each end 88, 90 of the respective cell 44, 46 may be perforated to fluidly couple the cell cavity 52, 70 to the flowpath 24. In other embodiments, one of the ends 88 or 90 of the respective cell 44, 46 may be non-perforated such that there is a fluid coupling between the cell cavity 52, 70 and the flowpath 24 only at the other end 90 or 88 of the respective cell 44, 46. In both embodiments, the respective cell 44, 46 may be tuned (e.g., as generally described above) to provide inverted soundwaves for destructively interfering with incoming soundwaves for sound attenuation. The cell 44, 46 of FIG. 11 may be tuned by tailoring (a) a distance along the face skin 32 and/or (b) longitudinal length of the cell 44, 46 based on (i) fluid flow velocity through the flowpath 24 and/or (ii) blade spacing of a bladed rotor in near (e.g., upstream or downstream of) the flowpath 24.

Figures 12, 13:
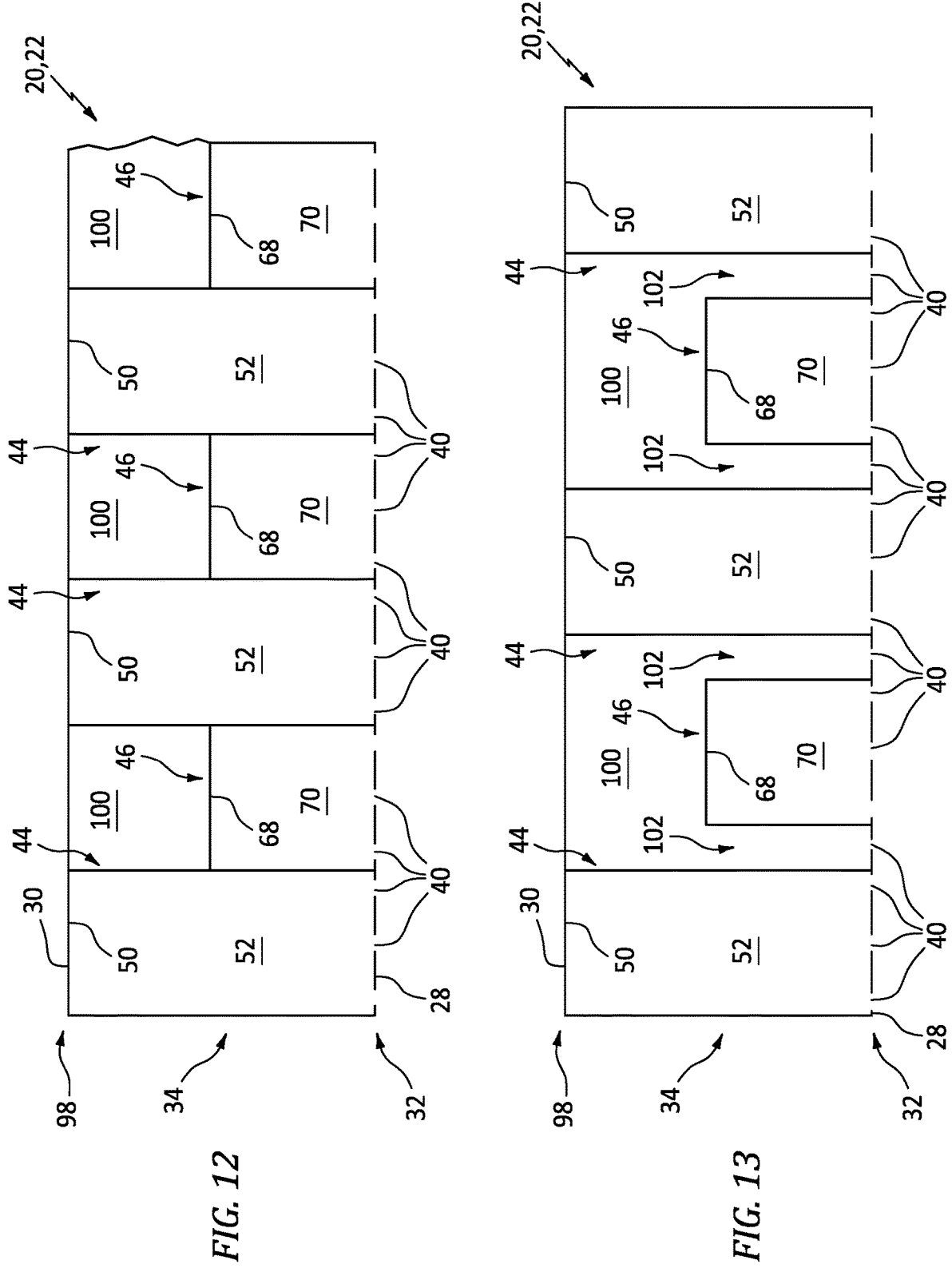
FIGS. 12 and 13 are partial schematic illustrations of the acoustic panel with a back skin and various acoustic panel cell arrangements.

Referring to FIGS. 1 and 2, the acoustic panel 20 is generally described above with its cellular core 34 forming the outer side 30 of the acoustic panel 20. However, referring to FIG. 12, the acoustic panel 20 may alternatively include a non-perforated back skin 98. The cellular core 34 of FIG. 12, for example, is arranged radially between and connected to the face skin 32 and the back skin 98. With this arrangement, the back skin 98 may include/form (or alternatively radially abut) the first endwalls 50. By contrast, while the back skin 98 of FIG. 12 laterally overlaps the second cells 46, each second endwall 68 is radially spaced from the back skin 98. An open volume 100 may thereby be formed by and vertically between one or more or all of the second endwalls 68 and the back skin 98. In some embodiments, the open volume 100 may be a sealed off volume (e.g., a sealed cavity) within the acoustic panel 20. In other embodiments, referring to FIG. 13, the open volume 100 may also include one or more interstices 102 between neighboring cells 44 and/or 46. Some or all of these interstices 102 may be fluidly coupled to the flowpath 24 through one or more respective face skin perforations 40. Here, the open volume 100 of FIG. 13 is configured as an interstitial space. In some embodiments, referring to FIGS. 12 and 13, each of the second endwalls 68 is non-perforated such that the open volume 100 is fluidly discrete (e.g., decoupled) from the adjacent second cavity 70. In other embodiments, one or more of the second endwalls 68 of FIGS. 12 and 13 may alternatively be perforated by one or more apertures that fluidly couple the respective second cavity 70 to the adjacent open volume.

For ease of description, the acoustic panel 20 is described above as extending axially along and circumferentially about the axis 26. With this arrangement, a vertical direction between the acoustic panel sides 28 and 30 is described as a radial direction. In other embodiments, however, the acoustic panel 20 may be reoriented such that the vertical direction is an axial direction, a circumferential direction, or otherwise.

Figure 14:
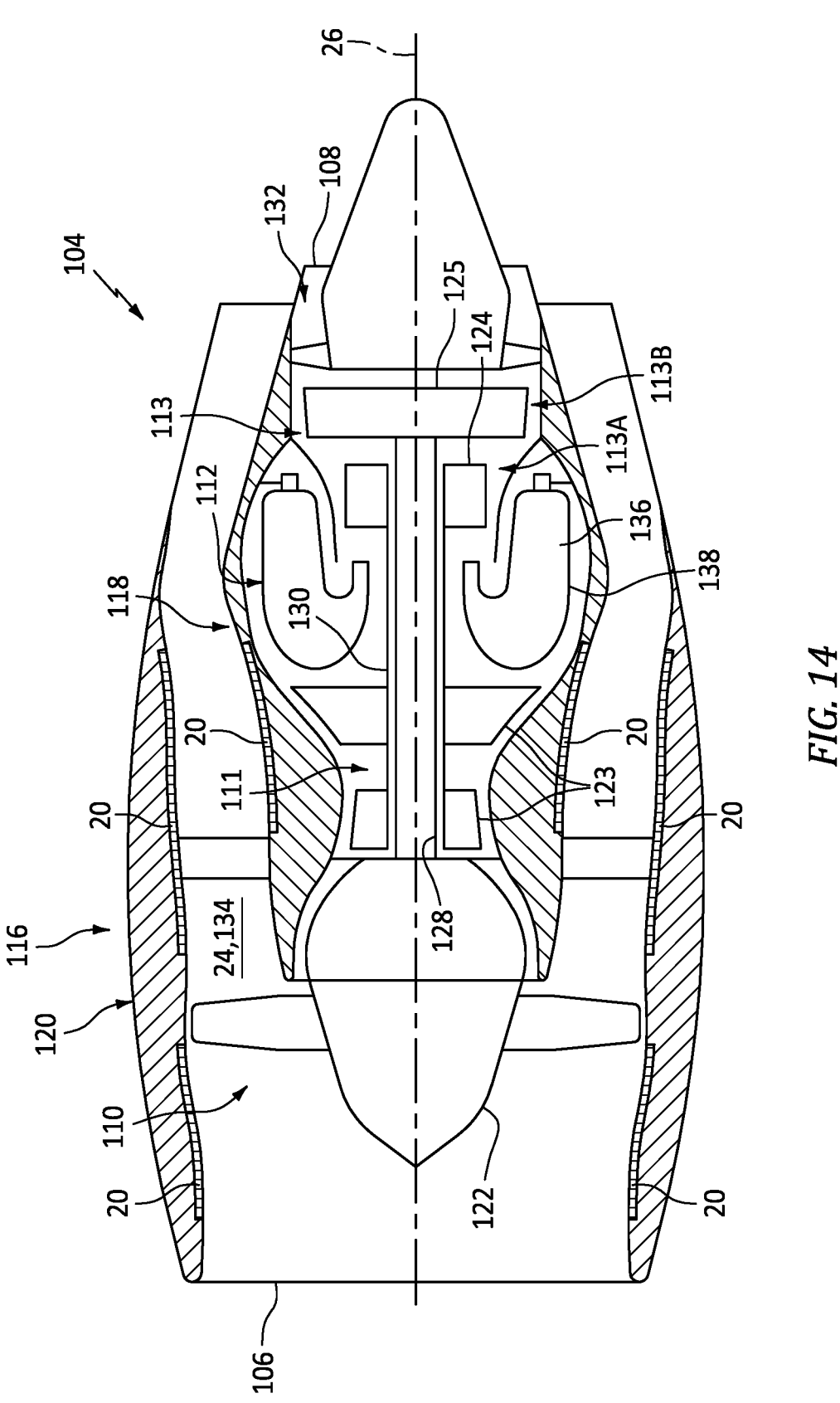
FIG. 14 is a schematic side sectional illustration of an aircraft propulsion system configured with one or more of the acoustic panels.

FIG. 14 illustrates an example of the aircraft propulsion system with which the one or more of the acoustic panels 20 may be configured. This aircraft propulsion system includes a turbofan gas turbine engine 104. The gas turbine engine 104 of FIG. 14 extends axially along the axis 26 between an upstream airflow inlet 106 and a downstream combustion products exhaust 108. The gas turbine engine 104 includes a fan section 110, a compressor section 111, a combustor section 112 and a turbine section 113. The turbine section 113 includes a high pressure turbine (HPT) section 113A and a low pressure turbine (LPT) section 113B, which LPT section 113B may also be referred to as a power turbine (PT) section.

The engine sections 110-113B are arranged within the engine housing 116. This engine housing 116 includes an inner housing structure 118 and an outer housing structure 120. The inner housing structure 118 may house one or more of the engine sections 111-113B; e.g., a core of the gas turbine engine 104. The outer housing structure 120 may house at least the fan section 110. The inner and the outer housing structures 118 of FIG. 14 also form a bypass duct. The inner and/or the outer housing structure 118 and/or 120 may each include one or more of the acoustic panels 20.

Each of the engine sections 110, 111, 113A and 113B includes a respective bladed rotor 122-125. Each of these bladed rotors 122-125 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The fan rotor 122 is connected to and driven by the LPT rotor 125 through a low speed shaft 128. The compressor rotor 123 is connected to and driven by the HPT rotor 124 through a high speed shaft 130. The shafts 128 and 130 are rotatably supported by a plurality of bearings (not shown). Each of these bearings is connected to the engine housing 116 by at least one stationary structure.

During operation, air enters the gas turbine engine 104 through the airflow inlet 106. This air is directed through the fan section 110 and into a core flowpath 132 and a bypass flowpath 134 (e.g., the flowpath 24). The core flowpath 132 extends sequentially through the engine sections 111-113B. The air within the core flowpath 132 may be referred to as "core air". The bypass flowpath 134 extends through the bypass duct, which bypasses the engine core. The air within the bypass flowpath 134 may be referred to as "bypass air".

The core air is compressed by the compressor rotor 123 and directed into a combustion chamber 136 of a combustor 138 in the combustor section 112. Fuel is injected into the combustion chamber 136 and mixed with the compressed core air to provide a fuel-air mixture. This fuel air mixture is ignited and combustion products thereof flow through and sequentially rotate the HPT rotor 124 and the LPT rotor 125. The rotation of the HPT rotor 124 drives rotation of the compressor rotor 123 and, thus, compression of the air received from a core airflow inlet. The rotation of the LPT rotor 125 drives rotation of the fan rotor 122, which propels the bypass air through and out of the bypass flowpath 134. The propulsion of the bypass air may account for a majority of thrust generated by the gas turbine engine 104.

The acoustic panel 20 may be included in various gas turbine engines other than the one described above. The acoustic panel 20, for example, may be included in a geared gas turbine engine where a geartrain connects one or more shafts to one or more rotors in a fan section, a compressor section and/or any other engine section. Alternatively, the acoustic panel 20 may be included in a gas turbine engine configured without a geartrain; e.g., a direct drive gas turbine engine. The acoustic panel 20 may be included in a gas turbine engine configured with a single spool, with two spools (e.g., see FIG. 14), or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU). The present disclosure therefore is not limited to any particular types or configurations of gas turbine engines. Furthermore, while the acoustic panel 20 is described above with respect to various aircraft applications, the acoustic panel 20 of the present application may alternatively be used for non-aircraft applications.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An acoustic panel for an aircraft, comprising:
   a skin comprising a plurality of perforations;
   a plurality of first cells, each of the plurality of first cells including a first tube, a first endwall and a first cavity, the first tube projecting vertically out from the skin to a distal end of the first tube, the first endwall closing off the first cavity at the distal end of the first tube, the first cavity extending vertically through the first tube from the skin to the first endwall, the first cavity fluidly coupled with a first set of one or more of the plurality of perforations, and the first cavity including a first vertical height and a first lateral width, and the first lateral width extending along an axis; and
   a plurality of second cells interspersed with the plurality of first cells, each of the plurality of second cells including a second tube, a second endwall and a second cavity, the second tube projecting vertically out from the skin to a distal end of the second tube, the second endwall closing off the second cavity at the distal end of the second tube and vertically offset from the first endwall of each of the plurality of first cells, the second cavity extending vertically through the second tube from the skin to the second endwall, the second cavity fluidly coupled with a second set of one or more of the plurality of perforations, the second cavity including a second vertical height and a second lateral width, and the second lateral width extending along the axis;
   wherein the second lateral width is greater than the first lateral width;
   wherein the first vertical height is greater than the second vertical height; and
   wherein the plurality of second cells are independent of the plurality of first cells.

2. The acoustic panel of claim 1, further comprising a plurality of third cells interspersed with the plurality of first cells and the plurality of second cells, each of the plurality of third cells including a third tube, a third endwall and a third cavity, the third tube projecting vertically out from the skin to a distal end of the third tube, the third endwall closing off the third cavity at the distal end of the third tube, the third endwall vertically offset from the first endwall of each of the plurality of first cells and the second endwall of each of the plurality of second cells, the third cavity extending vertically through the third tube from the skin to the third endwall, and the third cavity fluidly coupled with a third set of one or more of the plurality of perforations.

3. The acoustic panel of claim 1, wherein a first of the plurality of first cells is disposed laterally between and adjacent a first of the plurality of second cells and a second of the plurality of second cells.

4. The acoustic panel of claim 1, wherein
   a first of the plurality of first cells is adjacent a first of the plurality of second cells and a second of the plurality of second cells; and
   the first of the plurality of second cells is adjacent the second of the plurality of second cells.

5. The acoustic panel of claim 4, wherein a second of the plurality of first cells is adjacent the first of the plurality of second cells and the second of the plurality of second cells.

6. The acoustic panel of claim 1, further comprising a monolithic body including the plurality of first cells and the plurality of second cells.

7. The acoustic panel of claim 6, wherein the monolithic body further includes the skin.

8. The acoustic panel of claim 1, wherein the first cavity of each of the plurality of first cells has a first cross-sectional geometry;
   the second cavity each of the plurality of second cells has a second cross-sectional geometry; and
   the first cross-sectional geometry and the second cross-sectional geometry have a common shape.

9. The acoustic panel of claim 1, wherein at least one of; the first tube of each of the plurality of first cells has a straight centerline or the second tube of each of the plurality of second cells has a straight centerline.

10. The acoustic panel of claim 1, wherein at least one of the first tube or the second tube has a non-straight centerline.

11. The acoustic panel of claim 1, further comprising:
    a second skin forming the first endwall of each of the plurality of first cells;
    the second skin laterally overlapping and vertically spaced form each of the plurality of second cells.

12. The acoustic panel of claim 1, wherein
    the first set of the one or more of the plurality of perforations consists of a quantity X of the plurality of perforations; and
    the second set of the one or more of the plurality of perforations consists of a quantity Y of the plurality of perforations that is different than the quantity X.

13. The acoustic panel of claim 1, wherein a third set of one or more of the plurality of perforations is fluidly coupled with an interstitial space formed by and outside of one or more of the plurality of first cells and one or more of the plurality of second cells.

14. The acoustic panel of claim 1, wherein each of the plurality of second cells are circumferentially and axially spaced from each of the plurality of first cells.

15. An acoustic panel for an aircraft, comprising:
    a perforated skin extending axially along an axis;
    a non-perforated skin extending axially along about the axis; and
    a cellular core arranged vertically between and connected to the perforated skin and the non-perforated skin, the cellular core including:
       a plurality of first cells arranged in an array, each of the plurality of first cells extending radially between the perforated skin and the non-perforated skin, each of the plurality of first cells comprising an internal first cavity extending radially through the cellular core from the perforated skin to the non-perforated skin, and the internal first cavity including a first width extending along the axis; and a plurality of second cells arranged axially and circumferentially between neighboring first cells within the array of the plurality of first cells, each of the plurality of second cells projecting radially out from the perforated skin to a distal second cell end that is spaced radially from the non-perforated skin by an open volume, each of the plurality of second cells comprising an internal second cavity extending radially within the cellular core to the perforated skin, the internal second cavity including a second width extending along the axis, and the second width is greater than the first width.

16. An acoustic panel for an aircraft, comprising:
a perforated skin; and
a cellular core connected to the perforated skin, the cellular core including:
   a plurality of first cells arranged in an array, each of the plurality of first cells extending radially between perforated skin and a first cell distal end, each of the plurality of first cells comprising an internal first cavity extending radially through the cellular core from the perforated skin to the first cell distal end, and the internal first cavity including a lateral first width and a first vertical height, and the lateral first width extending along an axis; and a plurality of second cells dispersed within the array of the plurality of first cells, each of the plurality of second cells extending radially between the perforated skin and a second cell distal end, each of the plurality of second cells comprising an internal second cavity extending radially within the cellular core from the perforated skin to the second cell distal end, the internal second cavity including a lateral second width and a second vertical height, and the lateral second width extending along the axis;

wherein the first vertical height is greater than the second vertical height;

wherein the lateral second width is greater than the lateral first width; and wherein each of the plurality of first cells is surrounded by a cluster of second cells within the array of the plurality of first cells.

* * * * *